United States Patent [19]
Kume et al.

[11] Patent Number: 4,914,769
[45] Date of Patent: Apr. 10, 1990

[54] APPARATUS FOR CONVEYING INCUMBENT PERSON

[75] Inventors: Masao Kume; Kazuo Matsumoto, both of Osaka; Yukinobu Yao, Hyogo; Naoya Ishikawa, Osaka, all of Japan

[73] Assignees: Agency of Industrial Science & Technology; Ministry of International Trade & Industry, both of Tokyo, Japan

[21] Appl. No.: 313,450

[22] Filed: Feb. 22, 1989

[30] Foreign Application Priority Data

May 31, 1988 [JP] Japan ................................ 63-131629

[51] Int. Cl.$^4$ ................................................ A61C 7/08
[52] U.S. Cl. ........................................ 5/81 B; 5/81 C
[58] Field of Search ...................... 5/81 R, 81 B, 81 C; 198/321

[56] References Cited

U.S. PATENT DOCUMENTS 3,403,411 10/1968 Steinemann et al. ................ 5/81 R
3,493,979 2/1970 Koll et al. ............................ 5/81 C
3,829,915 8/1974 Dunkin ................................ 5/81 C
3,854,152 12/1974 Chez .................................... 5/81 C
4,087,873 5/1978 Ohkawa ................................ 5/81 B
4,794,655 1/1989 Ooka et al. .......................... 5/81 R

*Primary Examiner*—Michael F. Trettel
*Attorney, Agent, or Firm*—Oblon, Spivak, McClelland, Maier & Neustadt

[57] ABSTRACT

An apparatus for conveying a person lying on a support member includes a main body, a plate member, a guide frame for accommodating therein and causing the plate member to slide therealong toward and away from the person, a loading unit provided on the main body for supporting the plate member rotatably about a shaft, and a controller for controlling the rotation of the plate member. The plate member is controlled by the controller so that it is rotated about the shaft to slide along the guide frame toward the person until a forward end thereof abuts on the person, whereupon the forward end follows the contour of the person and advances into a gap between the person and the support member. Consequently, the person is loaded onto the plate member easily.

5 Claims, 4 Drawing Sheets

APPARATUS FOR CONVEYING INCUMBENT PERSON

BACKGROUND OF THE INVENTION

1. Field of the Invention

This invention relates to an apparatus for conveying an incumbent person, more particularly to an apparatus for conveying in an incumbent state a disabled person or an invalid (herein frequently referred to simply as a "person") lying on a bed, operating table, stretcher or the like and unable to stand or walk.

2. Prior Art Statement

For conveying such an incumbent person it is generally necessary to somehow bring a conveyance means near or in contact with the person and then to cause an operating force to act on the person. Conventional methods that are extensions of techniques for transporting heavy loads have been developed for this purpose and involve, for example, using an apparatus resembling a forklift to lift the person together with his bed or using a crane-like device suspended from the ceiling for lifting the person by means of a sling constituted of belts, a net or a sheet. In addition, one particularly excellent method that has been developed involves inserting a loading plate member between the person and the supporting surface (e.g. the top of a bed) and then conveying the person on the plate. In this method, the loading plate member has belts wound thereon and the belts are paid out synchronously with the movement of the plate member, thus eliminating slippage at the plate member surfaces in contact with the person and the supporting surface. The principle involved is shown in FIGS. 5(*a*), (*b*) and (*c*). The loading plate member 31 is constituted of upper and lower plates 31*a*, 31*b* which are separated by spacers 32 and respectively have belts 33*a* and 33*b* wound thereon. When moving toward the incumbent person 36 (FIG. 5(*a*)), the belt 33*a* on the upper plate rotates counterclockwise while the belt 33*b* on the lower plate rotates clockwise. The reference numerals 34 and 35 respectively denote the main body of the apparatus and the support (e.g. bed) on which the person 36 is lying. The upper plate 31*a* moves beneath the person 36 (FIG. 5(*b*)) and then after the person has been completely loaded on the upper segment of the loading plate member 31 as shown in FIG. 5(*c*), the loading plate member 31 is returned to the main body 35. At this time, the lower belt 33*b* only is rotated counter clockwise so that the person 36 can be conveyed without slippage between the contacting surfaces. A number of apparatuses for conveying incumbent persons which operate on this principle have been developed. These are described, for example, in U.S. Pat. Nos. 3,947,902, 3,967,328, 4,073,016, 4,077,073 and 4,680,818, U.S. patent application Ser. No. 031,668, and Japanese Patent Publication Nos. 47(1972)-34477, 56(1981)-16659, 56(1981)24536 and 56(1981)-34298. As a system Which has actually been marketed there can be mentioned the Full Automatic Stretcher DR-520 sold by Takara Belmont K.K. of Japan.

The incumbent person conveying devices employing these methods are capable of conveying an incumbent person with relatively small driving power but, depending on the use circumstances, entail a problem which arises from the fact that these belt-type conveying apparatuses are ordinarily designed solely for conveying a person lying on his or her back on a hard, inflexible supporting surface and operate by inserting the plate member into a gap between the person and the supporting surface. Thus when there is a difference in level exceeding the thickness of the plate member, a high degree of resistance arises and in some cases conveyance may be altogether impossible. It has been found through actual use that when such an apparatus is used to convey a person lying face up on a spring bed and causing the bed surface to be depressed to a relatively large extent, the person experiences a considerable pressure and friction.

OBJECT AND SUMMARY OF THE INVENTION

In view of the aforesaid shortcomings of the prior art apparatus for conveying incumbent persons, the object of this invention is to provide an apparatus for conveying an incumbent person which enables smooth conveyance of an incumbent person by minimizing the pressure exerted against the person to be loaded even in the case where there is a large difference in level between a loading plate member and the surface on which the person to be conveyed is lying.

For achieving this object, the present invention provides an apparatus for conveying an incumbent person wherein a loading plate member is inserted into a gap between the person to be conveyed and the support member on which the person is lying and the person is loaded onto and conveyed together with the loading plate member, the apparatus being characterized in comprising a shaft about which the loading plate member is rotatable, and a mechanical system and a control system for causing the forward edge of the loading plate member to follow the contour of person when the loading plate member is extended toward the person for loading.

Since the apparatus is provided with the mechanical and control systems it is able, at the time of extending the loading plate member toward the incumbent person, to cause the forward edge of the loading plate member coming into contact with the person to advance along the contour of the person and work its way between the person and the support member, whereby the loading plate can be inserted under the person with minimal force and the person can be conveyed smoothly.

The above and other features of the present invention will become apparent from the following description made with reference to the drawings.

BRIEF DESCRIPTION OF THE DRAWINGS

FIG. 1(*b*) is an explanatory view showing the apparatus of FIG. 1(*b*) in its state at the time of picking up an incumbent person.

FIG. 2(*b*) is an explanatory view showing the apparatus of FIG. 2(*a*) at the time of picking up an incumbent person.

FIG. 4(*b*) is a schematic view for explaining how the loading plate member follows the contour of the person.

DETAILED DESCRIPTION OF THE PREFERRED EMBODIMENTS

In an apparatus for conveying incumbent persons, when there is a difference in level between a loading plate member and the surface of the supporting surface (bed surface) on which the person to be conveyed is lying, the amount of force required for inserting the loading plate member under the person will vary according to the magnitude of the level difference insofar as the plate member is simply extended horizontally. The amount of pressure exerted on the person will also vary. Consider the example shown in FIG. 3. When two plate members 1*a* 1*b* positioned one above the other and having belts wound about their respective surfaces are extended toward a person 2 resting on a cushioned support surface 3, the upper and lower plate members make contact with the contour of the person 2 such that there is a level difference between the lower plate member 1*a* and the surface of contact between the person 2 and the support surface 3 of $h_1$ and a level difference between the upper plate 1*b* and the same surface of contact of $h_2$. The person 2 is pushed upward and loaded on the plate member 1*b*. At this time, the belts wound on the plate members 1*a*, 1*b*, are paid out as these plates are extended so that the friction that would otherwise arise between the person and the belts is completely shifted to friction between the belts an the plate members. Thus, assuming the weight of the person 2 acting on the points of contact with the plate members 1*a*, 1*b* to be $W_1$, $W_2$ respectively, the forces $F_1$, $F_2$ required for extending the plate members 1*a* 1*b* become $$F_1 = W_1 \tan \alpha_1;\ F_2 = W \tan \alpha_2$$

Figure 3:
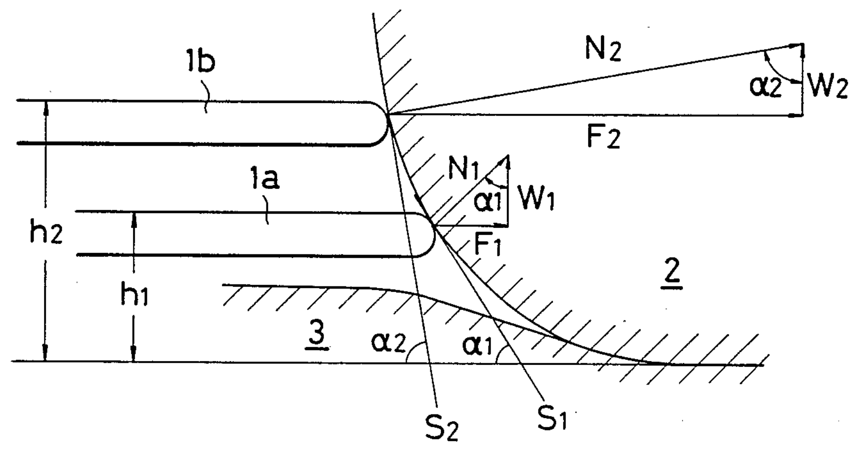
FIG. 3 is a schematic view for explaining the relationship between the level difference and the sliding angle at the time a loading plate member makes contact with a person on a support member.

(In FIG. 3, the straight lines $S_1$ and $S_2$ indicate the direction of travel of the belts at the respective points of contact.) If it is assumed that $W_1 = W_2$, it follows that $$F_1/F_2 = \tan \alpha_2 / \tan \alpha_1$$

and the amount of drive force that must be applied to extend the plate members varies greatly with the magnitude of the angles $\alpha_1$, $\alpha_2$ (the sliding angles). Generally speaking, a smaller level difference with respect to the person being loaded results in a smaller sliding angle $\alpha$. Thus the smaller the level difference is, the smoother will be the conveyance during loading. However, when the person is supported on a cushioned member such as a bed, the cushioned member will be depressed by the person's weight only in the vicinity of the person. This makes it difficult to lower the rigid loading plate members to the level of the person since this necessitates depressing the surface of the support member.

Therefore in the apparatus for conveying incumbent persons according to this invention, the plate members are supported so as to be rotatable about a horizontal shaft and a mechanism is provided for causing the forward edge of the plate members being extended toward the person to intrude under the person by following the contour of the person's body. By causing the forward edge of the plate members to follow the person's contour in this way, the sliding angles are reduced so that insertion of the plates beneath the person can be achieved smoothly with small driving force, thus facilitating the loading of the person on the plate members.

Figure 4A:
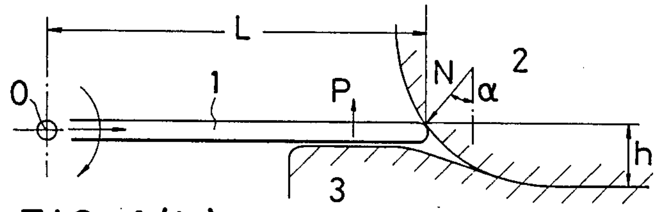
FIG. 4 (*a*) is a schematic view for explaining a state of contact between the loading plate member and the person.
Figure 4B:
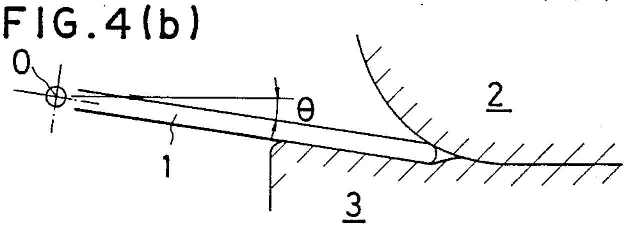
Figure 5A:
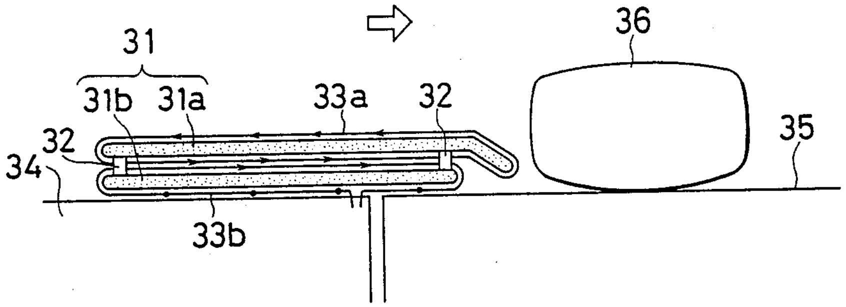
FIG.5(a) PRIOR ART
FIGS. 5(*a*), (*b*) and (*c*) are explanatory views demonstrating the operating principle of a conventional apparatus for conveying an incumbent person.
Figure 5B:
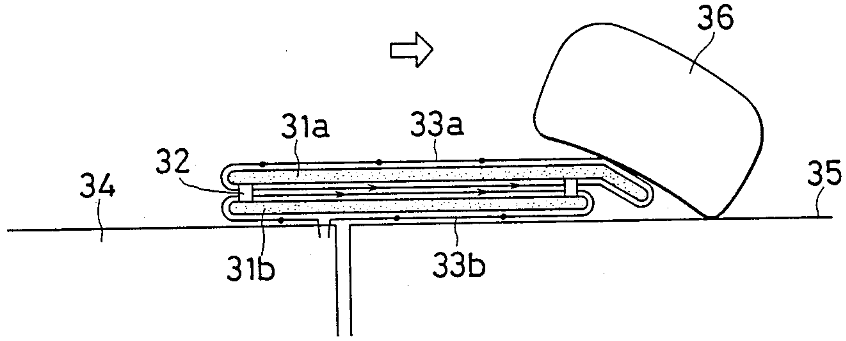
FIG.5(b) PRIOR ART
Figure 5C:
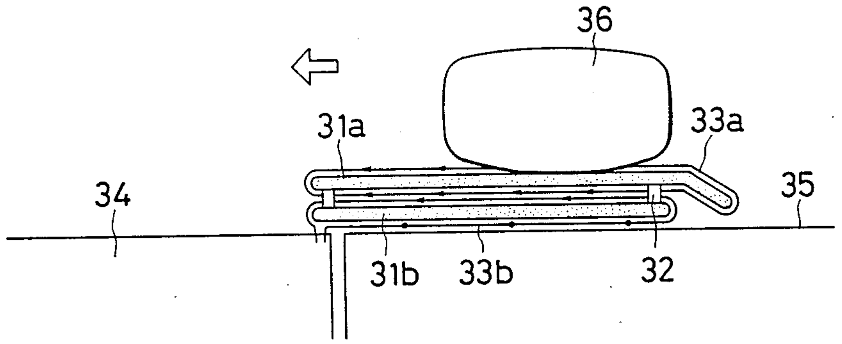
FIG.5(c) PRIOR ART

More specifically, as shown in FIG. 4(*a*), when a plate member 1 rotatably supported at one end 0 thereof is further extended even after coming into contact with the person 2 on the support member 3, the plate member 1 is acted on by a moment NL Cos $\alpha$, where N is the reaction force from the person 2. As a result, the forward edge of the plate member 1 noses down along the contour of the person 2 and moves downward and inward while pushing down the surface of the support member 3. Let the force of reaction from the support member 3 acting on the plate member 1 be P. Then when the moment about the point O caused by the force of reaction P becomes equal and opposite to NL Cos $\alpha$, the plate member stops its downward movement and starts to work its way into the gap between the person and the support member. At this time, if the plate member should slide under the person in an ideal manner without lifting the person whatsoever, it would follow that $$\alpha = \Theta = \tan^{-1}(h/L)$$

where $\Theta$ is the angle of the support member with respect to the horizontal. Therefore, at the time of inserting the plate member since the sliding angle $\alpha$ is held to less than the angle of inclination $\Theta$, the plate member can be inserted beneath the person by only a small driving force, making it possible to load and convey the person smoothly. Even in a case where the support member has a hard cushion so that the plate member cannot move downward sufficiently, a similar effect can nevertheless be obtained since the sliding angle becomes smaller with increasing downward movement of the forward edge.

Figures 1A, 1B:
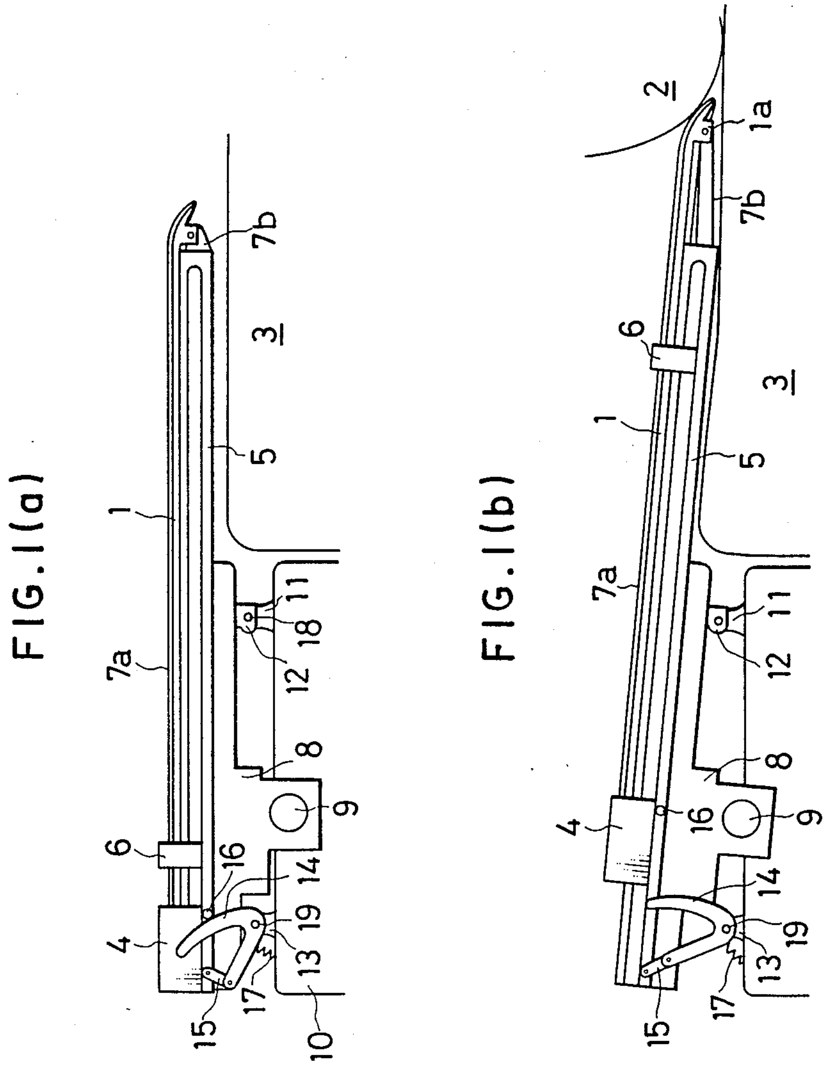
FIG. 1(*a*) is a schematic side view of an embodiment of the apparatus for conveying an incumbent person according to the present invention.

Referring to FIGS. 1(*a*) and (*b*), which show a first embodiment of the apparatus for conveying incumbent persons according to this invention, a loading plate member 1 has a plate holder 4 formed integrally therewith for guiding the plate member 1 along a guide frame 5. Reference numeral 6 designates a belt guide which engages with an upper belt 7*a* and moves along the guide frame 5, numeral 8 designates a loading unit having a drive mechanism (not shown) for the plate member 1, and numeral 9 designates an electric motor of the drive mechanism. The main body of the apparatus is designated by the numeral 10 and the supporting member (bed) on which the person to be conveyed rests by 3. A bearing 12 is provided on the bottom of one end of the loading unit 8 and another bearing 11 is provided on the top of one end of the main body 10. A shaft 18 passes through both of the bearings 11, 12, whereby the loading unit 8 is rotatably supported on the main body 10. The main body 10 has a bearing 13 on the top of the other end thereof and a U-shaped link 14 is pivotally supported on the bearing 13 via a shaft 19. One arm of the U-shaped link 14 is rotatably connected with the guide frame 5 via a link 15 and the other arm thereof is positioned so that when the plate member 1 is retracted toward the loading unit 8 along the belt guide 6 the other arm will be contacted by a pin 16 fixed on the plate holder 4 and rotated while overcoming the force of a compression spring 17. Therefore, when the plate member 1 is extended, the compression spring 17 urges the loading unit 8 to rotate clockwise about the shaft 18. Further, since the compression spring 17 and the U-shaped link 14 are not connected with each other, there is no restriction on the rotation of the loading unit 8 after the plate member 1 has been extended up to a prescribed length. This arrangement makes it possible to adjust the following action of the forward edge of the plate member along the contour of the person being conveyed by adjusting the force exerted by the compression spring 17.

In the figures, the reference numeral 7*b* designates a lower belt.

When the apparatus 10 for conveying incumbent persons is used, it is first brought to the side of the support member (bed) 3 on which the person to be conveyed is lying such that the tip of the guide frame 5 rests on the surface of the support surface 3. The motor 9 is then operated to extend the plate member 1 along the guide frame 5 together with the plate holder 4. The forward edge of the plate member 1 thus approaches the person.

At this time, the force of the compression spring 17 rotates the loading unit 8 clockwise about the shaft 18, causing the plate member 1 to assume an inclined attitude which is maintained by the links 14, 15 as the forward edge of the plate member 1 approaches the person. If the angle of inclination of the plate member 1 is smaller than the angle of inclination Θ, the forward edge of the plate member 1 moves downward and inward following the contour of the person 2 and thus inserts itself into the gap between the person 2 and the support surface 3, as illustrated in FIG. 4(*a*). When the angle of inclination of the plate member 1 is larger than the angle of inclination Θ, the forward edge of the plate member 1 advances while depressing the surface of the support surface 3 and thus inserts itself into the gap between the person 2 and the support surface 3, as shown in FIG. 4(*b*).

In either case, the upper belt 7*a* and lower belt 7(*b*) are simultaneously paid out along the upper and lower surfaces of the plate member 1.

Once the plate member 1 has been extended to a extent, the engagement between the U-shaped link 14 and the pin 16 is released. From this point on, the compression spring 17 has no further effect on the operation and the loading unit 8 is free to rotate without restriction. This means that the following action of the forward edge of the plate member along the contour of the person being conveyed can be adjusted by adjusting the biasing force of the compression spring 17.

Figures 2A, 2B:
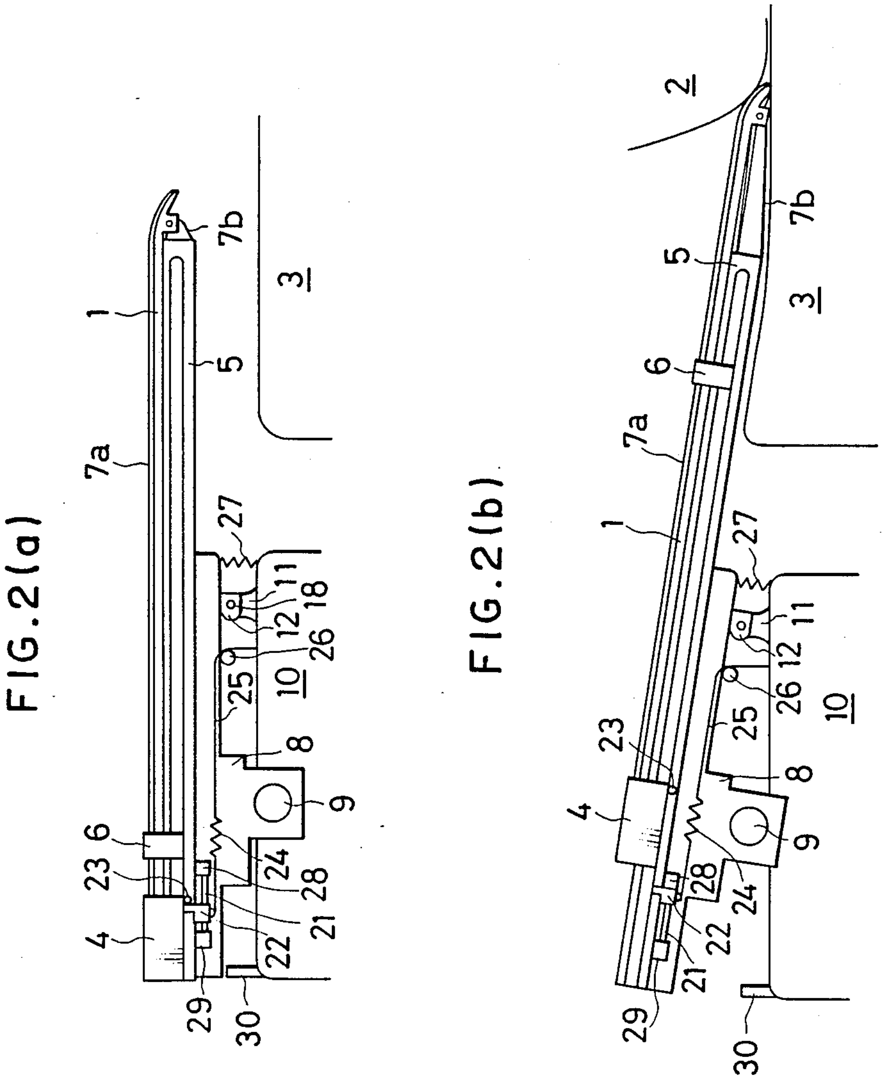
FIG. 2(*a*) is a schematic side view of another embodiment of the apparatus for conveying an incumbent person according to the present invention.

FIGS. 2(*a*) and (*b*) show a second embodiment of the apparatus for conveying an incumbent person according to this invention. The loading unit 8 supported on the top of the main body 10 to be rotatable about the shaft 18 is of the same structure as that in embodiment of FIG. 1 but between one end thereof and the opposing portion of the main body 10 there is provided a tension spring 27 which draws the loading unit 8 toward the main body 10. In addition, the side of the main body 10 has a projection 30 serving as a stop for restricting the rotation of the loading unit 8. On the bottom surface of the guide frame 5 at the portion where the plate holder 4 is located there are provided a pair of bearings 28, 29 for supporting a shaft 21. A pin pusher 22 slides along the shaft 21 such that when the plate holder 4 is at such a position of the guide frame 5 as to be retracted onto the loading unit 8 the pin pusher 22 makes contact with a pin 23 fixed on the plate holder 4. The pin pusher 22 is connected with one end of a tension spring 24 the other end of which is connected to a wire 25. The wire 25 passes from the tension spring 24 over a pin 26 and is fastened at its other end to the main body 10. Thus the pin pusher 22 is constantly urged in the direction of extension of the plate member 1.

In the apparatus for conveying incumbent persons according to this second embodiment, extension of the plate member 1 causes the pin 23 on the plate holder 4 to move right in the figures, which allows the pin pusher 22 to move right as well. As a result, the tension of the spring 24 is reduced so that the moment about the shaft 18 becomes smaller than the moment produced by the tension spring 27. The loading unit 8 therefore rotates clockwise. By appropriately adjusting the tension of the springs 24 and 27, therefore, it becomes possible to optimize the contour following action of the forward edge of the loading plate member 1 and thus to enable insertion of the plate member 1 beneath the person with minimum force.

As will be understood from the foregoing description, in the apparatus for conveying an incumbent person according to this invention the loading plate member is made rotatable about a horizontal shaft so that when it is extended toward the person to be conveyed its forward edge will progress downward and inward following the contour of the person's body. Thus even in situations where the person is lying on a cushioned support member and has sunk deeply into the cushioning material, it is still possible to insert the plate member beneath the person with a small driving force. Smooth conveyance is thus possible. Moreover, as the rotation control means of the loading unit is of very simple structure, the likelihood of a breakdown or malfunction is extremely small.

What is claimed is:

1. An apparatus for conveying a person lying on a support member, comprising:
   - a main body;
   - a plate member onto which a person is loaded for conveyance by inserting it into a gap between the person and the support member and on which a belt is wound;
   - slide means for accommodating said plate member therein and causing said plate member to slide therealong toward and away from the person;
   - support means rotatable on said main body about a shaft for supporting said plate member; and
   - control means for controlling said plate member so that said plate member is rotated about said shaft to slide along said slide means toward the person until a forward edge of said plate member abuts on the person, whereupon said forward edge follows the contour of the person and advances into said gap.

2. An apparatus according to claim 1, further comprising means for applying resistance to the rotation of said plate member about said shaft in accordance with an amount of the advance of said forward edge into said gap.

3. An apparatus according to claim 1, further comprising holding means for holding said plate member in a prescribed attitude when said plate member is accommodated in said slide means.

4. A apparatus according to claim 1, wherein said control means comprises a plurality of links which are provided on said main body and connected to said support means for supporting said plate member at a position apart from said support means, and spring means for controlling rotation of said links.

5. An apparatus according to claim 1, wherein said control means comprises spring means having one end thereof connected to said slide means and the other end thereof connected to said main body.

* * * * *